United States Patent

[11] 3,607,953

[72] Inventor Edward Hurley, Jr.
    Littleton, Colo.
[21] Appl. No. 814,150
[22] Filed Apr. 7, 1969
[45] Patented Sept. 21, 1971
[73] Assignee Marathon Oil Company
    Findlay, Ohio

[54] PROCESS FOR PRODUCTION OF 2,2-BIS(HALOMETHYL)-1,3-PROPANEDIOL FROM PENTAERYTHRITOL
8 Claims, No Drawings

[52] U.S. Cl. .................................................. 260/633,
                                                         260/615 R
[51] Int. Cl. ........................................................ C07c 31/34
[50] Field of Search .......................................... 260/633

[56] References Cited
UNITED STATES PATENTS

| | | | |
|---|---|---|---|
| 1,386,118 | 8/1921 | Kirst .......................... | 260/633 X |
| 2,144,612 | 1/1939 | Britton et al. ............... | 260/633 |
| 3,287,425 | 11/1966 | Maynard ..................... | 260/653.3 |
| 3,378,465 | 4/1968 | Brandt et al. ............... | 260/326.5 FN X |
| 3,436,318 | 4/1969 | Glass ......................... | 260/326.5 FN X |
| 3,448,118 | 6/1969 | Chichery et al. ............ | 260/326.5 FN |

FOREIGN PATENTS

| 955,234 | 1/1957 | Germany ..................... | 260/633 |

OTHER REFERENCES

Saucier et al., Can. J. Chem., 44 (13) pp. 1599– 1601, 1966 260/633

Chem. Abstract 58 8456C 1963

*Primary Examiner*—Howard T. Mars
*Attorneys*—Joseph C. Herring, Jack E. Hummel and Richard C. Willson, Jr.

ABSTRACT: Production of 2,2-(Halomethyl)-1,3-propanediol by reacting pentaerythritol with anhydrous HBr or HCl in the presence of N-alkylpyrrolidone in which the alkyl groups contain from one to about six carbon atoms is taught. The process is also applicable to the production of the corresponding di-products from di-pentaerythritol.

PROCESS FOR PRODUCTION OF 2,2-BIS(HALOMETHYL)-1,3-PROPANEDIOL FROM PENTAERYTHRITOL

BACKGROUND OF THE INVENTION

1. Field of the Invention

The present invention relates to the production of 2,2-bis(bromomethyl)-1,3-propanediol from pentaerythritol and the corresponding tetra-products from di-pentaerythritol and also to the corresponding chloro-derivatives.

2. Description of the Prior Art:

2,2-bis(bromomethyl)-1,3-propanediol, melting point 109–10° C. 1, 3-propanediol, reported by Saucier, Sauriol, and Salvador in Can. J. Chem. 44 (13), 1599–601 (1966) (Fr) which is abstracted at 65 Chem. Abstracts 5353 c. That process involved heating pentaerythritol for 8–10 hours with HBr in acetic acid. Sharts & McLeod teach, at 30 Journal of Organic Chemistry (10) page 3308 (1965) production of 2,2-bis(bromomethyl)1,3-propanediol by heating pentaerythritol under reflux with hydrobromic acid and acetic acid for 18 hours. Cheymol, Chabrier, Seyden-Penne, and Thibodeau, Bul. Soc. Chim. France 1964 (6) 1268–75 (reported at 61 Chem. Abs. 9451 $d$), teach the production of $(HOCH_2)_2C(CH_2Br)_2$ m. p. 110° by refluxing pentaerythritol with HBr in acetic acid/acetic anhydride for 60 hours. (See E. R. Buchman & D. H. Deutsch, "Spirane Hydrocarbons," ONR Technical Report, Calif. Institute of Technology, 1951.)

SUMMARY

1. General Statement of the Invention

The invention embodies the discovery that by the selection of N-lower alkyl-pyrrolidones as the solvent rather than the acetic acid employed by previous processes, provides a very efficient addition reaction which permits the obtaining of comparable yields in less than five hours. While the invention is not to be limited to any particular mechanism, it appears that a particular associated bond between the N-alkyl pyrrolidone and the HBr or HCl is formed and this bond gradually releases the hydrogen halide in molecular amounts. The selection of the N-alkyl pyrrolidones is especially significant since other basic nitrogen-containing solvents frequently thought of as equivalents, e.g. dimethylformamide, etc. form either too strong a complex with the hydrogen halide (thus extending the reaction time or preventing the reaction from occurring) or form too weak an association with the hydrogen halide (thus releasing the hydrogen halide more rapidly than it can react with the pentaerythritol). Water is, of course, formed in the reaction and should be removed (by absorption or preferably by distillation) so that the reaction mixture is maintained in a substantially anhydrous state. While minor amounts of water (less than 5 percent by weight, more preferably less than 1 percent) can be tolerated, the lower the water content the more efficient the reaction process.

2. Utility of the Invention

The compound 2,2-bis(bromomethyl)-1,3-propanediol is well known as a useful "polyol" for the production of flame resistant polyesters and polyurethanes (see for example, Weaver and Larsen "Flame Retardant Unsaturated Polyesters based on 2,2-bis(bromomethyl)-1,3-propanediol," 155th meeting—ACS—Organic Coatings and Plastics Chemistry pg. 196, Vol. 28 number 1 Apr. 1968. See also "Self-extinguishing Polyester Resins" R. C. Nametz, Industrial & Eng. Chemistry, Vol. 59 number 5, May, 1967, pg. 99–116. In addition, the chloro and bromo compounds produced by the invention are useful in the synthesis of other organic compounds.

DESCRIPTION OF THE PREFERRED EMBODIMENTS

1. Starting Materials

As discussed above, the starting materials for the present invention are pentaerythritol or di-pentaerythritol; anhydrous HBr or anhydrous HCl and N-alkylpyrrolidones in which the alkyl groups contain from 1 to about 6 carbon atoms.

Preferably from about 1 to about 20 more preferably from about 2.0 to about 10, and most preferably from about 2.5 to about 5 moles of N-alkylpyrrolidone will be present for each mole of hydrogen halide in the reaction mixture at the start of the reaction. Most conveniently, the N-alkylpyrrolidone can be treated with the hydrogen halide to form the associated salt, e.g. NMP·HBr and this salt can be added to pentaerythritol together with additional quantities of N-alkylpyrrolidone.

To maximize the yield of the preferred dihalo product, preferably from about 1.5 to about 2.5, more preferably from about 1.75 to about 2.25, and most preferably from about 1.9 to about 2.1 moles of hydrogen halide will be present for each mole of pentaerythritol present in the mixture at the start of the reaction. In general, the number of moles of hydrogen halide will most preferably just equal the number of moles of -OH groups desired to be replaced, e.g. one mole of HX is used/mole of pentaerythritol when monohalopentaerythritol is the desired product; 2 moles for the dihalo product, etc.

Of course, starting materials may be added gradually rather than being batched together at the start of the reaction.

2. Temperature

The reaction will preferably be conducted at a temperature of from about 50° to about 250° C., more preferably from about 150° to about 200° C., and most preferably from about 160° to about 190° C.

The reaction is preferably conducted at a temperature sufficiently high so as to distill over the water formed during the reaction, together with a small amount of the N-alkylpyrrolidone. It is an important advantage of the reaction that the loss of hydrogen halide is virtually eliminated because of the association between the hydrogen halide and the N-alkylpyrrolidone which reduces the volatility of the hydrogen halide and holds it in the reaction mixture until it is very gradually released to react with the pentaerythritol.

3. Pressure

In general, the reaction will be conducted under reflux conditions at atmospheric pressure. Under special circumstances, the reaction could be conducted at supra-atmospheric pressure, or at sub atmospheric pressure so long as adequate provision for removal of water was provided.

4. Reaction Time

The reaction will preferably be continued for 0.05 to about 5, more preferably from 0.1 to about 4, and most preferably from 1 to about 3 hours. As stated above, the speed with which the reaction occurs is an important advantage of the present process over those conventionally used for the production of the products.

5. Batch and Continuous

While the Examples describe the invention on a batch basis, it may, of course, be practiced on a continuous basis with continuous addition of starting materials, continuous removal of products, and with recycle of unreacted starting materials back into the reactor.

6. Examples:

EXAMPLE I

Production of 2,2-bis(bromomethyl)-1,3-propanediol from from pentaerythritol, HBr and NMP 60.3 (0.745 mole) anhydrous HBr is added to 200 g. (2.02 moles) NMP to produce a NMP·HBr salt having a halide content of 30.1 weight percent.

136 g. of this NMP·HBr salt (0.507 mole HBr) is placed in a 500 ml. flask equipped with magnetic stirrer and Clausen takeoff head connected to a receiver. 34.5 g. (0.253 mole) pentaerythritol and 50 g. (0.505 mole) N-methylpyrrolidone are added and the flask is heated to 170° C. H₂O begins to distill out after approximately one hour. After three hours 12.2 grams of H₂O/NMP have distilled over. A silver nitrate test then indicates no HBr has distilled over. Water (500 ml.) and 50 ml. concentrate HCl are added to the reaction flask and the product mixture is then extracted with ethyl ether.

The ether phase is dried and stripped yielding 33 grams or 50 percent yield of 2,2-bis(bromomethyl)-1,3-propanediol. An aliquot of the product is recrystallized from benzene and shows a melting point of 109°–110° C. (literature melting point is 109°–110° C. (literature melting point is 190°–110° C.).

EXAMPLE II

Production of 2,2-bis(chloromethyl)1,3-propanediol using pentaerythritol, NMP and HCl.

The steps of Example I are repeated, substituting HCl for HBr and recovering 2, 2-bis(chloromethyl)1, 3-propanediol in similar yield.

EXAMPLE III

Use of N-butylpyrrolidone in place of NMP

The steps of Example I are repeated, substituting N-butyl-pyrrolidone for the N-methylpyrrolidone and a similar yield of the same product is obtained.

EXAMPLE IV

Use of dipentaerythritol

The process of Example I is repeated, utilizing di-pentaerythritol in place of pentaerythritol and recovering a similar yield of 2, 2, 2′,2′-tetrakis-di-propylenediol

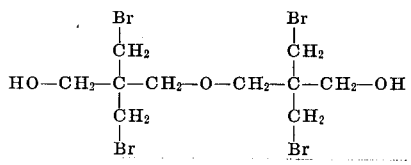

7. Modifications of the Invention

It should be understood that the invention is capable of a variety of modifications and variations in addition to those described above and illustrated by the Examples.

I claim:

1. A process for the production of 2,2-bis(halo-methyl)-1,3-propanediol comprising reacting pentaerythritol with the anhydrous HBr or anhydrous HCl salt of N-alkyl pyrrolidone at atmospheric pressure and at about 50 to about 250° C. for from about 0.05 to about 5 hours in the presence of from about 1 mole to about 20 moles of N-alkyl-pyrrolidone in which the alkyl groups contain from 1 to about 6 carbon atoms, per mole of anhydrous HBr or anhydrous HCl as the salt of the N-alkyl pyrrolidone and removing water as it is formed in the reaction.

2. The process of claim 1 wherein the starting materials comprise pentaerythritol and the anhydrous HBr salt of N-alkyl pyrrolidone.

3. The process of claim 1 wherein the starting materials comprise pentaerythritol and the anhydrous HCl salt of N-alkyl pyrrolidone.

4. The process of claim 2 wherein the N-alkyl-pyrrolidone is N-methylpyrrolidone.

5. The process of claim 3 wherein the N-alkyl-pyrrolidone is N-methylpyrrolidone.

6. The process of claim 1 wherein the N-alkyl-pyrrolidone is N-methylpyrrolidone.

7. A process according to claim 1 wherein there are present 1.5 to about 2.5 moles of HBr or HCl salt per mole of pentaerythritol, and wherein the reaction is conducted at a temperature of from about 150 to about 200° C. and wherein the solvent is N-methylpyrrolidone.

8. A process according to claim 7 wherein the pentaerythritol is reacted with the HBr salt.